US010990944B2

(12) United States Patent
May

(10) Patent No.: US 10,990,944 B2
(45) Date of Patent: Apr. 27, 2021

(54) METHODS AND SYSTEMS FOR RELAYING A PAYMENT CARD DETAIL DURING A TELEPHONE CALL BETWEEN A CUSTOMER'S TELEPHONE AND A VENDOR'S TELEPHONE

(71) Applicant: Cameron May, Reading (GB)

(72) Inventor: Cameron May, Reading (GB)

( * ) Notice: Subject to any disclaimer, the term of this patent is extended or adjusted under 35 U.S.C. 154(b) by 0 days.

(21) Appl. No.: 17/030,585

(22) Filed: Sep. 24, 2020

(65) Prior Publication Data
US 2021/0090046 A1 Mar. 25, 2021

(30) Foreign Application Priority Data

Sep. 25, 2019 (WO) ................ PCT/GB2019/052697

(51) Int. Cl.
G06Q 40/00 (2012.01)
G06Q 20/16 (2012.01)
(Continued)

(52) U.S. Cl.
CPC ........... *G06Q 20/16* (2013.01); *G06Q 20/405* (2013.01); *G06Q 20/40145* (2013.01);
(Continued)

(58) Field of Classification Search
CPC ............. G06Q 20/16; G06Q 20/40145; G06Q 20/405; G06Q 20/40975; G10L 13/02
See application file for complete search history.

(56) References Cited

U.S. PATENT DOCUMENTS 5,887,266 A * 3/1999 Heinonen ................ G07G 1/12
455/558
5,995,590 A 11/1999 Brunet et al.
(Continued)

FOREIGN PATENT DOCUMENTS

EP 2224427 A1 9/2010
EP 3690880 A1 8/2020
(Continued)

OTHER PUBLICATIONS

Lerner, "Products that talk," IEEE Spectrum. (Year: 1982).*
(Continued)

*Primary Examiner* — Alexander G Kalinowski
*Assistant Examiner* — William B. Bunker
(74) *Attorney, Agent, or Firm* — Ulmer & Berne LLP

(57) ABSTRACT

There is provided a method for relaying a payment card detail during a telephone call between a customer's telephone and a vendor's telephone, the customer's telephone storing the payment card detail therein, the method comprising: initiating a telephone call between the customer and the vendor; the customer's telephone receiving a predetermined input; during the telephone call, the customer's telephone accessing the payment card detail stored in the customer's telephone based on the predetermined input; and the customer's telephone audibly relaying to the vendor the accessed payment card detail, wherein audibly relaying to the vendor the accessed payment card detail comprises the customer's telephone converting, using at least one text-to-speech algorithm, the accessed payment card detail to an audible message containing the payment card detail and audibly relaying the audible message during the telephone call.

9 Claims, 4 Drawing Sheets

(51) Int. Cl.
  *G06Q 20/40* (2012.01)
  *G10L 13/02* (2013.01)
  *H04M 3/51* (2006.01)

(52) U.S. Cl.
  CPC ........ *G06Q 20/40975* (2013.01); *G10L 13/02* (2013.01); *H04M 3/5166* (2013.01)

(56) References Cited

U.S. PATENT DOCUMENTS

| | | | | |
|---|---|---|---|---|
| 7,702,313 | B1* | 4/2010 | Goecke | G06Q 20/322 455/411 |
| 8,459,560 | B1* | 6/2013 | Mineo-Goggin | G02B 5/32 235/487 |
| 2004/0243496 | A1 | 12/2004 | Kim et al. | |
| 2008/0152107 | A1* | 6/2008 | Mendiola | G06Q 40/00 379/114.01 |
| 2008/0173717 | A1* | 7/2008 | Antebi | G06Q 20/045 235/439 |
| 2009/0012793 | A1 | 1/2009 | Dao et al. | |
| 2010/0279658 | A1* | 11/2010 | Singh | H04M 1/7255 455/412.1 |
| 2012/0173635 | A1* | 7/2012 | Wormald | G06Q 10/107 709/206 |
| 2012/0245944 | A1* | 9/2012 | Gruber | G06F 16/3329 704/270.1 |
| 2015/0127538 | A1* | 5/2015 | Tew | H04M 3/493 705/44 |
| 2015/0130887 | A1* | 5/2015 | Thelin | H04N 7/147 348/14.03 |
| 2016/0104145 | A1* | 4/2016 | Critchley | H04W 12/02 705/41 |
| 2018/0174152 | A1 | 6/2018 | Fortin et al. | |
| 2020/0134597 | A1* | 4/2020 | Berdugo | G06Q 20/40 |
| 2020/0160321 | A1* | 5/2020 | Arzumanyan | G06Q 20/36 |
| 2020/0236547 | A1* | 7/2020 | Flanagan | H04W 12/06 |
| 2020/0251088 | A1* | 8/2020 | Collins | G10L 13/047 |
| 2020/0302423 | A1* | 9/2020 | Vijayaraghavan | G06F 21/32 |
| 2021/0051136 | A1* | 2/2021 | Critchley | H04W 12/02 |

FOREIGN PATENT DOCUMENTS

| | | |
|---|---|---|
| KR | 100995030 B1 | 3/2005 |
| KR | 1020070103816 A | 10/2007 |
| WO | WO-2015096503 A1 * 7/2015 | ............ H04M 15/72 |
| WO | WO-2019219980 A1 * 11/2019 | ............ G06Q 20/363 |

OTHER PUBLICATIONS

Bhayani, "Developing Converged Application using Open Source Software," IEEE Symposium on Industrial Electronics and Applications (Year: 2009).*

International Search Report and Written Opinion of the International Searching Authority issued in International Application No. PCT/GB2019/0052697; dated May 29, 2020; 14 pages.

UK IPO, Combined Search and Examination Report under Sections 17 and 18(3) for Application No. GB2015119.7; dated Jan. 6, 2021; 9 pages.

* cited by examiner

METHODS AND SYSTEMS FOR RELAYING A PAYMENT CARD DETAIL DURING A TELEPHONE CALL BETWEEN A CUSTOMER'S TELEPHONE AND A VENDOR'S TELEPHONE

PRIORITY

This application claims the benefit of PCT/GB2019/052697, filed on Sep. 25, 2019, the disclosure of which is incorporated by reference herein in its entirety.

TECHNICAL FIELD

The present disclosure relates to a method for relaying a payment card detail during a telephone call between a customer's telephone and a vendor's telephone, and particularly to a method for audibly relaying the payment card detail by the customer's telephone converting, using at least one text-to-speech algorithm, the payment card detail to an audible message containing the payment card detail and audibly relaying the audible message during the telephone call. The present disclosure also relates to a non-transitory computer readable medium tangibly carrying computer executable instructions for carrying out the same.

BACKGROUND

In many situations, a customer may be required to make a payment during a telephone call with a vendor. For example, this may be required when making a purchase for goods or services during a telephone call with the vendor. In these situations, with the methods and systems currently known in the art, the customer is required to retrieve, during the call, their payment card and relay the payment card details required by the vendor to authorize the payment.

However, as this is carried out during the telephone call with the vendor and therefore usually whilst the customer is holding their telephone, this normally results in a physical limitation during the call as the customer has to retrieve the payment card and hold their telephone at the same time. As the payment card is typically initially stored within a wallet, retrieving the payment card during the call tends to prove physically challenging in many situations, especially if the customer is involved in other activities during the phone call such as walking, running or cycling.

Furthermore, with currently known methods and systems, the customer is required to read the card payment details aloud into their phone to relay the card payment details to the vendor. This presents significant security risks especially if the customer is attempting to hold the telephone call in a public space as a third party may eavesdrop and obtain the customer's payment card details.

In view of the above, there is a need for a physically convenient and secure method for relaying a payment card detail during a telephone call between a customer's telephone and a vendor's telephone. There is also a need for a physically convenient and secure system for relaying a payment card detail during a telephone call between a customer's telephone and a vendor's telephone.

SUMMARY OF THE DISCLOSURE

Accordingly, it is an object of the present disclosure to provide a physically convenient and secure method for relaying a payment card detail during a telephone call between a customer's telephone and a vendor's telephone. It is also an object of the present disclosure to provide a physically convenient and secure system for relaying a payment card detail during a telephone call between a customer's telephone and a vendor's telephone.

Preferred embodiments are recited in the dependent claims.

According to a first aspect, there is provided a method for relaying a payment card detail during a telephone call between a customer's telephone and a vendor's telephone, the customer's telephone storing the payment card detail therein, the method comprising: initiating a telephone call between the customer and the vendor; the customer's telephone receiving a predetermined input; during the telephone call, the customer's telephone accessing the payment card detail stored in the customer's telephone based on the predetermined input; and the customer's telephone audibly relaying to the vendor the accessed payment card detail, wherein audibly relaying to the vendor the accessed payment card detail comprises the customer's telephone converting, using at least one text-to-speech algorithm, the accessed payment card detail to an audible message containing the payment card detail and audibly relaying the audible message during the telephone call.

As the customer's telephone stores the payment card detail therein and audibly relays the payment card detail to the vendor during the telephone call, the customer does not need to retrieve their payment card and therefore does not need to physically handle the payment card during the telephone call. This means that the customer may audibly relay their payment card detail whilst only interacting with their telephone. This therefore provides for a physically convenient method for relaying a payment card detail during a telephone call between a customer's telephone and a vendor's telephone.

Additionally, as the customer's telephone itself audibly relays the payment card detail to the vendor, the customer themselves need not speak the payment card detail. This therefore provides for increased security as a third party cannot eavesdrop and obtain the relayed payment card detail. Hence, the method is also a secure method for relaying a payment card detail during a telephone call between a customer's telephone and a vendor's telephone.

In certain implementations, receiving the predetermined input comprises the customer inputting the predetermined input using the customer's telephone.

With such implementations, the customer may physically conveniently select when to audibly relay their payment card detail without having to physically obtain their payment card. For example, upon prompting from the vendor, the customer may input the predetermined input into their phone such that the phone audibly relays the payment card detail. Such implementations provide for a physically convenient manner to selectively relay payment card details.

In certain implementations, the predetermined input comprises the customer selecting a key or a sequence of keys on the customer's telephone.

With such implementations, the customer may select in a physically conveniently manner when to audibly relay their payment card detail without having to physically obtain their payment card. Such implementations provide for a physically convenient manner to selectively relay payment card details.

In certain implementations, receiving the predetermined input comprises the vendor inputting the predetermined input using the vendor's telephone and the vendor's telephone relaying the inputted predetermined input to the customer's telephone.

With such implementations, the vendor may select when to audibly receive the customer's payment card detail without having to request the payment card detail from the customer or without having the customer physically obtain their payment card. For example, once the vendor is ready to receive the payment card detail, the vendor may input the predetermined input into their phone thereby triggering the customer's phone to audibly relay the payment card detail to the vendor. Such implementations provide for a physically convenient manner to selectively relay payment card details within minimum physical requirements from the customer.

In certain implementations, the predetermined input comprises the vendor selecting a key or a sequence of keys on the vendor's telephone.

With such implementations, the vendor may select in a physically conveniently manner when to audibly receive the customer's payment card detail without requiring the customer to physically obtain their payment card. Such implementations provide for a physically convenient manner to selectively relay payment card details.

In certain implementations, the method further comprises: the customer's telephone receiving a second predetermined input; during the telephone call, the customer's telephone accessing a second payment card detail stored in the customer's telephone based on the second predetermined input; and the customer's telephone audibly relaying to the vendor the accessed second payment card detail, wherein audibly relaying to the vendor the accessed second payment card detail comprises the customer's telephone converting, using at least one text-to-speech algorithm, the accessed second payment card detail to a second audible message containing the second payment card detail and audibly relaying the second audible message during the telephone call.

With such implementations, two different payment card details may be relayed to the vendor each being selectively relayed by input of the two different predetermined inputs. This results in a convenient way for the vendor to receive the various payment card details when the various details are required.

In certain implementations, the method comprises receiving security authorization from the customer using the customer's telephone, and, optionally, wherein the security authorization is in the form of receiving a passcode/password, a fingerprint, a retinal-recognition image and/or a facial-recognition image from the customer using the customer's telephone.

With such implementations, any payment card detail is only relayed once the security authorization from the customer has been received. Accordingly, this increases security as the vendor cannot access any payment card information until the customer specifically authorizes the payment.

In certain implementations, the method comprises receiving the predetermined input comprises receiving the security authorization.

With such implementations, the predetermined input includes the security authorization from the customer. Therefore, the first payment card detail cannot be related unless the customer has authorized the relaying of it. Accordingly, this increases security as the vendor cannot access the first payment card detail until the customer specifically authorizes the payment.

In certain implementations, the method comprises audibly relaying to the customer the accessed payment card detail whilst audibly relaying to the vendor the accessed payment card detail.

With such implementations, the customer can at all times hear via their telephone which information is being relayed to the vendor by their telephone. This means that the customer can verify the correct information is being relayed to the vendor and stop the relaying of information at any time during the call for security reasons.

In certain implementations, the customer's telephone stores a first set of payment card details associated with a first payment card and comprising the accessed payment card detail and a second set of payment card details associated with a second payment card.

With such implementations, the customer's telephone can store two payment cards therein. Accordingly, the customer has greater freedom in choosing how to pay (i.e. which payment card).

According to a second aspect, there is provided a non-transitory computer readable medium tangibly carrying computer executable instructions for relaying a payment card detail during a telephone call between a customer's telephone and a vendor's telephone, the customer's telephone storing the payment card detail therein, the instructions being executable to implement: initiating a telephone call between the customer and the vendor; the customer's telephone receiving a predetermined input; during the telephone call, the customer's telephone accessing the payment card detail stored in the customer's telephone based on the predetermined input; and the customer's telephone audibly relaying to the vendor the accessed payment card detail, wherein audibly relaying to the vendor the accessed payment card detail comprises the customer's telephone converting, using at least one text-to-speech algorithm, the accessed payment card detail to an audible message containing the payment card detail and audibly relaying the audible message during the telephone call.

As the customer's telephone stores the payment card detail therein and audibly relays the payment card detail to the vendor during the telephone call, the customer does not need to retrieve their payment card and therefore does not need to physically handle the payment card during the telephone call. This means that the customer may audibly relay their payment card detail whilst only interacting with their telephone. This therefore provides for a physically convenient method for relaying a payment card detail during a telephone call between a customer's telephone and a vendor's telephone.

Additionally, as the customer's telephone itself audibly relays the payment card detail to the vendor, the customer themselves need not speak the payment card detail. This therefore provides for increased security as a third party cannot eavesdrop and obtain the relayed payment card detail. Hence, the executable method is also a secure method for relaying a payment card detail during a telephone call between a customer's telephone and a vendor's telephone.

BRIEF DESCRIPTION OF THE DRAWINGS

For a better understanding of the present disclosure and to show how the same may be carried into effect, reference will now be made, by way of example only, to the accompanying drawings, in which.

DETAILED DESCRIPTION

Figure 1:
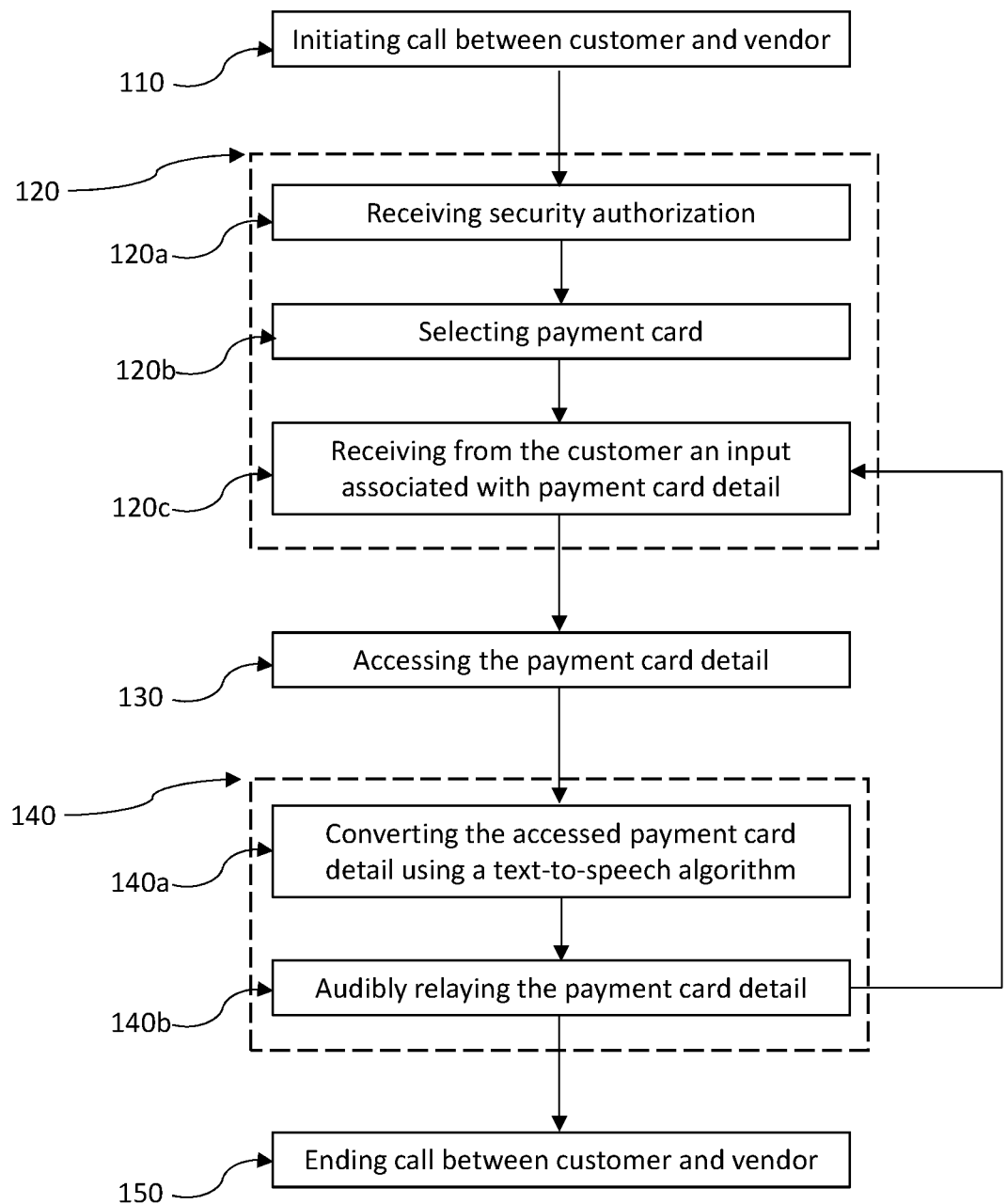
FIG. 1 shows a first implementation of a method for relaying a payment card detail during a telephone call between a customer's telephone and a vendor's telephone.

FIG. 1 shows a first implementation of a method for relaying a payment card detail during a telephone call between a customer's telephone and a vendor's telephone.

In step 110, a telephone call is initiated between a customer and a vendor using the customer's telephone and the vendor's telephone.

In certain implementations, during the telephone call, the customer and the vendor may agree that a payment is required over the telephone. Accordingly, in certain implementations, the customer may wish to provide at least one payment card detail to the vendor during the telephone call. The at least one payment card detail may be used for complete payment for goods/services or for securing a booking.

Thereafter, in step 120, the customer's telephone receives a predetermined input. In the implementation shown in FIG. 1, the customer's telephone receives the predetermined input by the customer inputting the predetermined input using the customer's telephone. For example, the predetermined input may be entered using the customer's telephone's user interface such as a touchscreen, microphone and/or camera.

As shown in FIG. 1, the customer's telephone receiving the predetermined input in step 120 comprises, in step 120a, the customer's telephone receiving security authorization from the customer. In certain implementations, the security authorization may be in the form of receiving a passcode/password, a fingerprint, a retinal-recognition image and/or a facial-recognition image from the customer using the customer's telephone.

Receiving security authorization from the customer in step 120a may be the first element of the overall predetermined input received in step 120.

In certain implementations, if the security authorization from the customer is unsuccessful, the customer's telephone may output an error message to the customer.

If the security authorization from the customer is unsuccessful, the input received by the customer's telephone would not match the required predetermined input and the customer's telephone would not proceed to step 130 (described below).

As shown in FIG. 1, the customer's telephone receiving the predetermined input in step 120 further comprises, in step 120b, the customer's telephone receiving a selection of a payment card from the customer.

The customer's telephone stores one or more sets of payment card details therein. For example, the customer's telephone may store one, two, three, four or five sets of payment card details therein.

The one or more sets of payment card details are each associated with a payment card.

For example, at least one set of payment card details or each set of payment card details comprises at least one number and/or at least one date.

In certain implementations, at least one set of payment card details or each set of payment card details comprises: a first number, a second number and a date. Optionally, the first number may be a sixteen-digit number, the second number may be a three-digit number. The at least one set of payment card details or each set of payment card details may optionally further comprise: a second date and/or a string of text, for example, a name.

In step 120b, the customer may select which payment card out of the one or more payment cards that should be relayed to the vendor. For example, the customer may select a numerical key on their telephone to select which payment card to proceed with and/or the customer may select a visual prompt on a screen of the customer's telephone which represents the payment card, for example, an image of the payment card.

As shown in FIG. 1, the customer's telephone receiving the predetermined input in step 120 further comprises, in step 120c, the customer's telephone receiving an input associated with a payment card detail of the selected payment card.

For example, the customer may select an input on their phone which is associated with one of the payment card details in the set of payment card details of the selected payment card.

Thereafter, in step 130, the customer's telephone accesses the associated payment card detail stored therein and in step 140 relays this accessed payment card detail to the vendor.

Specifically, step 140 comprises, in step 140a, converting the accessed payment card detail from a string (for example containing text and/or numbers) to an audible message using at least one text-to-speech algorithm.

Thereafter, in step 140b, the audible message containing the payment card detail is audibly relayed to the vendor during the telephone call. As used herein, 'audibly relayed' refers to relaying a message containing speech which is understood by a human being.

In step 140b, the audible message may also be relayed to the customer whilst audibly relaying the accessed payment card detail to the vendor.

Thereafter, the vendor may request another type of payment card detail and therefore the method may return to step 120c in which another input associated with another payment card detail of the selected payment card is received.

A return to step 120c may be performed until the vendor has received all required payment card details of the selected payment card.

Once the final payment card detail is received, the vendor may process the payment using the received payment card detail(s). Thereafter, in step 150, the telephone call between the customer and the vendor may be terminated.

With the above-described method, as the customer's telephone stores the payment card detail therein and audibly relays the payment card detail to the vendor during the telephone call, the customer does not need to retrieve their payment card and therefore does not need to physically handle the payment card during the telephone call. This means that the customer may audibly relay their payment card detail whilst only interacting with their telephone. This therefore provides for a physically convenient method for relaying a payment card detail during a telephone call between a customer's telephone and a vendor's telephone.

Additionally, as the customer's telephone itself audibly relays the payment card detail to the vendor, the customer themselves need not speak the payment card detail. This therefore provides for increased security as a third party cannot eavesdrop and obtain the relayed payment card detail. Hence, the method is also a secure method for relaying a payment card detail during a telephone call between a customer's telephone and a vendor's telephone.

Moreover, as the customer does not manually read out the payment card details, the potential for an error during the relaying of the payment card details is eliminated. This method therefore provides for an improved accuracy in relaying payment card details over the telephone. As the potential for an error has been eliminated from the customer's side, the chances for restarting the payment process due to an error is greatly reduced thereby further improving the convenience of making a payment over the telephone.

Throughout the entire method, the customer may terminate the telephone call between the customer and the vendor. Additionally or alternatively, throughout the entire method, the customer may terminate the relaying of the payment card detail to the vendor at any stage.

Figure 2:
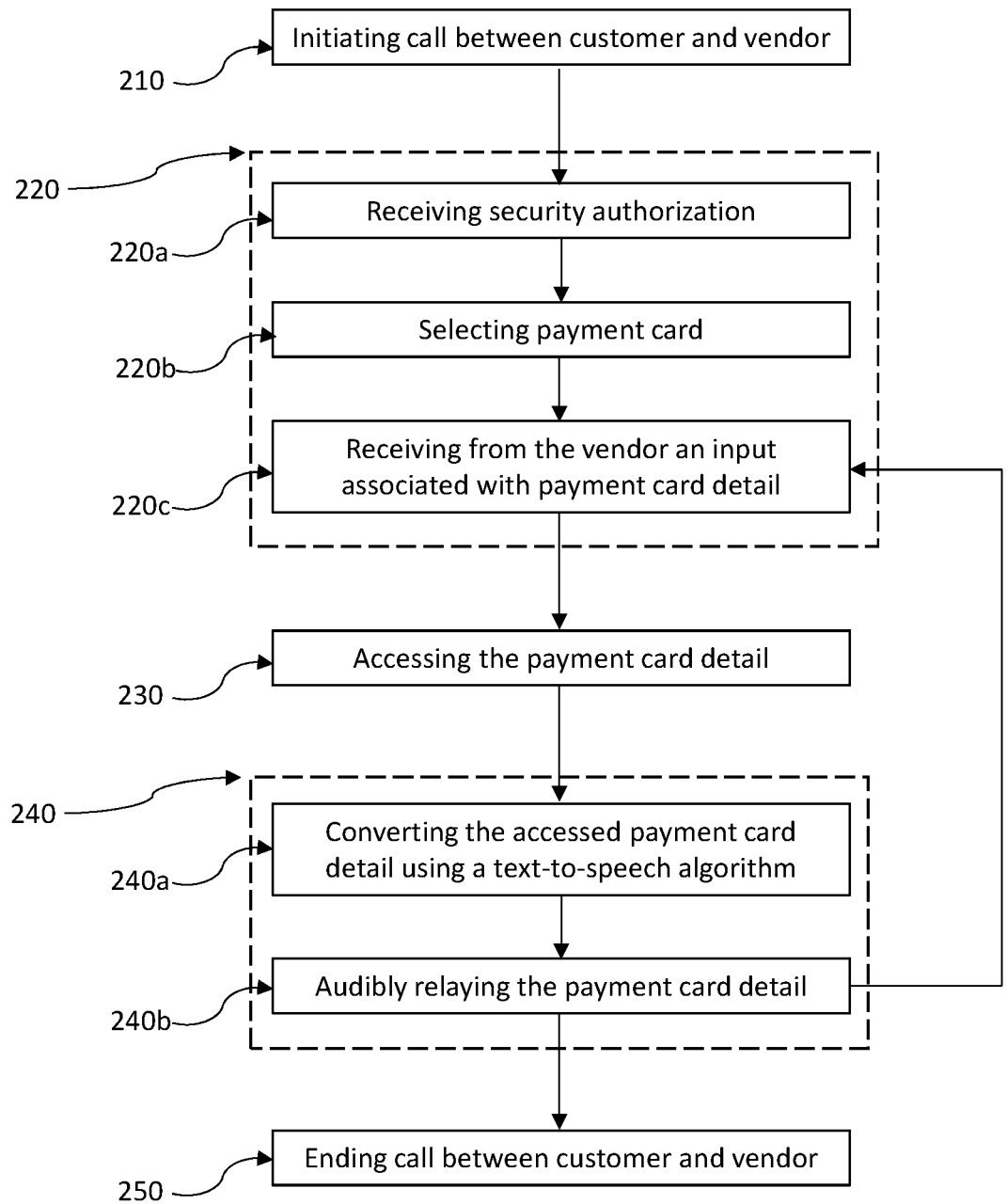
FIG. 2 shows a second implementation of a method for relaying a payment card detail during a telephone call between a customer's telephone and a vendor's telephone.

FIG. 2 shows a second implementation of a method for relaying a payment card detail during a telephone call between a customer's telephone and a vendor's telephone. The second implementation is similar to that shown in FIG. 1 and therefore only the differences will be discussed below.

In particular, the second implementation differs in that step 220 comprises, in step 220c, the customer's telephone receiving an input associated with a payment card detail of the selected payment card, in which the input is received from the vendor.

Specially, in step 220c, the vendor may select an input on the vendor's telephone, said input then being relayed to the customer's telephone and being received by the customer's telephone as an input.

In certain implementations, the vendor's telephone may relay the input the customer's telephone using dual-tone multi-frequency signaling or any other means of communication.

Figure 3:
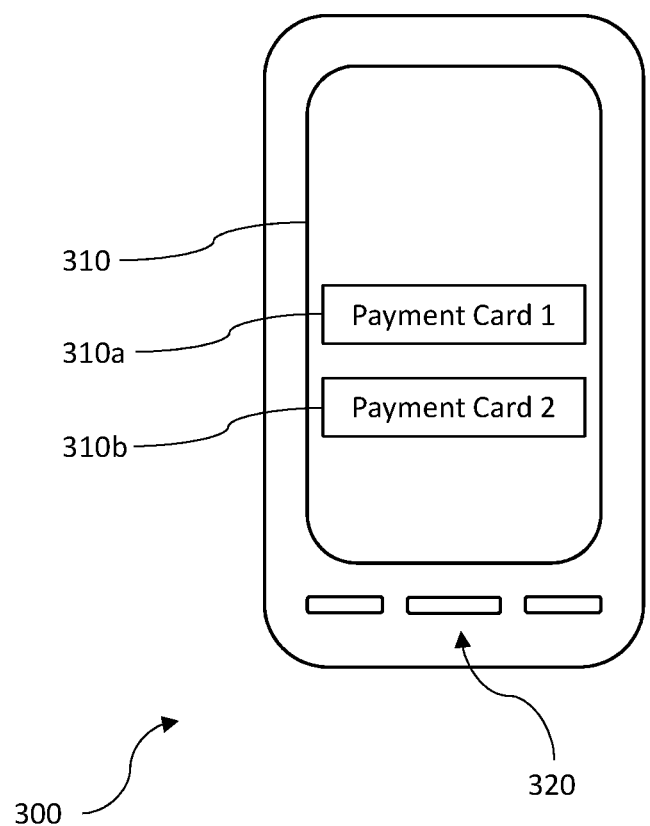
FIG. 3 shows an example of a telephone which may be used in accordance with the present disclosure, the telephone showing a first selection screen.

FIG. 3 shows an example of a telephone which may be used in accordance with the present disclosure. In FIG. 3, the telephone is illustrated as showing a first selection screen.

The telephone shown in FIG. 3 is a mobile telephone 300 comprising a screen 310, optionally being a touchscreen, and three pushbuttons 320. The mobile telephone 300 may be used by the customer.

The mobile telephone 300 includes a non-transitory computer readable medium (not shown) carrying executable instructions for carrying out any of the methods disclosed herein.

The mobile telephone 300 stores therein at least one set of payment card details associated with a payment card.

In the configuration shown in FIG. 3, the screen 310 shows a first selection screen which can be used in step 120b or 220b of the methods described above. In particular, the first selection screen shown on screen 310 allows the customer to select a payment card out of a first payment card and a second payment card by selecting the first payment card button 310a and the second payment card button 310b respectively.

Figure 4:
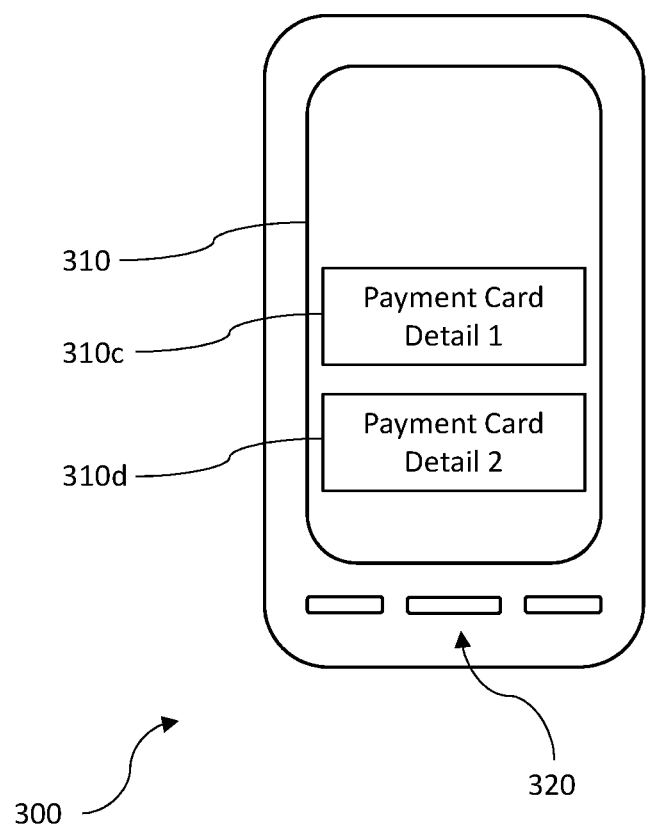
FIG. 4 shows the telephone of FIG. 3 with a second selection screen.

FIG. 4 shows the telephone of FIG. 3 with a second selection screen shown on the screen 310.

In the configuration shown in FIG. 4, the screen 310 shows the second selection screen which can be used in step 120c of the methods described above. In particular, the second selection screen shown on screen 310 allows the customer to select a payment card detail out of the set of payment card details associated with the selected payment card. The second selection screen allows the customer to select a first payment card detail or a second payment card detail by selecting the first payment card detail button 310c and the second payment card detail button 310d respectively.

Although the above explanation is considered to fully clarify how the present invention may straightforwardly be put into effect by those skilled in the art, it is to be regarded as purely exemplary.

For example, even though FIGS. 3 and 4 show a mobile telephone, the present disclosure may be implemented using a landline telephone which does not comprise a screen or touchscreen. For example, all inputs may be entered using a physical keypad and all outputs may be given using the telephones speaker.

Furthermore, the payment card details of the set of payment card details do not need to be audibly relayed in isolation as in FIGS. 1 and 2. Instead, after receiving a predetermined input, the customer's telephone may access all payment card details associated with the selected payment card and audibly relay all payment card details in a single audible message to the vendor.

Any of the above methods may be implemented using software being part of the customer's telephone's operating system (such as Android or iOS) or being part of an application installed on the customer's telephone.

In any of the above methods, the customer's telephone may store any of the payment card details associated with payment cards on an application which is part of the customer's telephone's operating system (such as Android or iOS) or being part of an application installed on the customer's telephone. For example, the customer's payment card details may be stored on Apple Pay, Google Pay or any other application of the like.

All of the above are fully within the scope of the present disclosure and are considered to form the basis for alternative embodiments in which one or more combinations of the above-described features are applied, without limitation to the specific combinations disclosed above.

In light of this, there will be many alternatives which implement the teaching of the present disclosure. It is expected that one skilled in the art will be able to modify and adapt the above disclosure to suite its own circumstances and requirements within the scope of the present disclosure, while retaining some or all technical effects of the same, either disclosed or derivable from the above, in light of his comment general knowledge in this art. All such equivalents, modifications or adaptations fall within the scope of the invention hereby defined and claimed.

The invention claimed is:

1. A method for relaying a customer's payment card detail during a telephone call between a customer's telephone and a vendor's telephone, the customer's telephone comprising a display, a non-transitory storage device, and a processor configured to execute a software application installed on the telephone, the method comprising:
   (a) receiving, by the software application, the payment card detail and storing the payment card detail on the non-transitory storage device;
   (b) initiating a purchase transaction via a telephone call between the customer and the vendor, wherein the telephone call comprises a voice-to-voice connection through which each of the vendor and the customer may audibly relay information to complete the purchase transaction;
   (c) during the telephone call, displaying via the display, by the software application, an interface to the customer and receiving, by the interface, a predetermined input associated with the payment card detail, wherein the input causes the software application to access the payment card detail;
   (d) converting, by the customer's telephone, using at least one text-to-speech algorithm associated with the software application, the payment card detail to a digital signal, wherein the digital signal is transmissible via the voice-to-voice connection and is configured to cause the vendor's telephone to relay to the vendor the payment card detail via a speaker of the vendor's telephone, wherein the vendor is a human and the relayed payment card detail is audible speech understood by the human; and (e) transmitting the digital signal to the vendor's telephone via the voice-to-voice connection.

2. The method of claim 1, further comprising receiving security authorization from the customer using the customer's telephone, wherein the security authorization is in the form of receiving one or more of a password, a fingerprint, a retinal-recognition image, or a facial-recognition image from the customer's telephone.

3. The method of claim 1, further comprising audibly relaying to the customer the accessed payment card detail whilst audibly relaying to the vendor the accessed payment card detail.

4. The method of claim 1, wherein the customer's telephone stores a first set of payment card details associated with a first payment card and comprising the accessed payment card detail and a second set of payment card details associated with a second payment card.

5. A user device comprising:
   (a) a processor, a non-transitory storage device, and a memory, wherein the non-transitory storage device is configured to store one or more payment card details, including at least a first payment card detail, and wherein the processor is configured to execute a software application installed on the non-transitory storage device;
   (b) a display;
   (c) a user interface usable by a user to provide input; and
   (d) a telephone communication device configured to provide two way audio communication;
   wherein the processor is configured to, as part of a payment detail relay process and by execution of the software application:
   (i) receive the first payment card detail and store the first payment card detail on the non-transitory storage device;
   (ii) establish a communication channel with a vendor's telephone via the telephone communication device, wherein the communication channel comprises a voice-to-voice connection through which each of a customer and a vendor may audibly relay information;
   (iii) in response to a predetermined input that indicates the start of a transaction, cause one or more graphics associated with the one or more payment card details to display via the display;
   (iv) create an audible message based on the first payment card detail, wherein the audible message comprises synthesized speech describing the first payment card detail;
   (v) in response to the user selecting a first graphic of the one or more graphics that is associated with the first payment card detail, via the user interface, convert the audible message to a digital signal, wherein the digital signal is transmissible via the voice-to-voice connection and is configured to cause the vendor's telephone to relay to the vendor the first payment card detail via a speaker of the vendor's telephone, wherein the vendor is a human and the relayed first payment card detail is audible speech understood by the human; and
   (vi) transmit the digital signal to the vendor's telephone via the voice-to-voice connection.

6. The user device of claim 5, wherein the software application is configured on the user device as an integrated feature of an operating system installed on the user device.

7. The user device of claim 5, wherein the processor is further configured to cause each of the one or more graphics to display via the display as an image of a payment card associated with that graphic.

8. The user device of claim 5, wherein the processor is further configured to audibly relay the audible message over the communication channel so that it is audible to the vendor but not the user.

9. A method for providing a payment detail relay process for a user device, the user device comprising a processor, a non-transitory storage device, and a display, wherein the processor is configured to execute a software application installed on the non-transitory storage device, the method comprising, with the processor of the user device:
   (a) storing one or more payment card details, including at least a first payment card detail, on the non-transitory storage device of the user device;
   (b) establishing a communication channel with a vendor's telephone via a telephone communication device of the user device, wherein the communication channel comprises a voice-to-voice connection through which each of a customer and a vendor may audibly relay information;
   (c) in response to a predetermined input that indicates the start of a transaction, displaying one or more graphics associated with the one or more payment card details via a display of the user device;
   (d) creating an audible message based on the first payment card detail, wherein the audible message comprises synthesized speech describing the first payment card detail; and
   (e) in response to a user selecting a first graphic of the one or more graphics that is associated with the first payment card detail, via a user interface of the user device, converting the audible message to a digital signal, wherein the digital signal is transmissible via the voice-to-voice connection and is configured to cause the vendor's telephone to relay to the vendor the first payment card detail via a speaker of the vendor's telephone, wherein the vendor is a human and the relayed first payment card detail is audible speech understood by the human; and
   (f) transmitting the digital signal to the vendor's telephone via the voice-to-voice connection.

* * * * *